United States Patent
Patzlaff

[15] 3,703,072
[45] Nov. 21, 1972

[54] RASPBERRY HARVESTER

[72] Inventor: Albert W. Patzlaff, Holland, Mich.

[73] Assignee: Blueberry Equipment, Inc., South Haven, Mich.

[22] Filed: Dec. 20, 1971

[21] Appl. No.: 209,602

[52] U.S. Cl. ................................................56/330
[51] Int. Cl. .............................................A01g 19/00
[58] Field of Search.......56/330, 328, 130, 116, 12.4, 56/12.5, 13.5

[56] References Cited

UNITED STATES PATENTS

| | | |
|---|---|---|
| 3,494,117 | 2/1970 | Weygandt et al............56/330 |
| 3,611,689 | 10/1971 | Patzlaff.......................56/330 |
| 3,636,688 | 1/1972 | Fontau et al.................56/330 |

Primary Examiner—Louis G. Mancene
Assistant Examiner—J. N. Eskovitz
Attorney—Austin A. Webb

[57] ABSTRACT

A mobile carriage has vertical bush engaging frames in opposed relation to engage opposite sides of the bushes as the carriage advances along a crop row. The frames are divided horizontally into upper and lower sections. The frames are further divided vertically into leading and trailing sections. The frame sections are vertically pivoted at their leading ends and have rearwardly extending vertically spaced flexible bush engaging rods. Each pair of opposed sections has one section that is spring biased inwardly toward the side of the bush, while the opposed section is vibratorily oscillated about its pivot to engage and shake the opposite side of the bush. The leading sections on one side of the machine are oscillated, while the trailing sections on the opposite side are oscillated. Separate and independent drive motor oscillate the driven frame sections on opposite sides of the machine; while the upper and lower driven frame sections can be oscillated in different and variable phase sequence.

13 Claims, 4 Drawing Figures

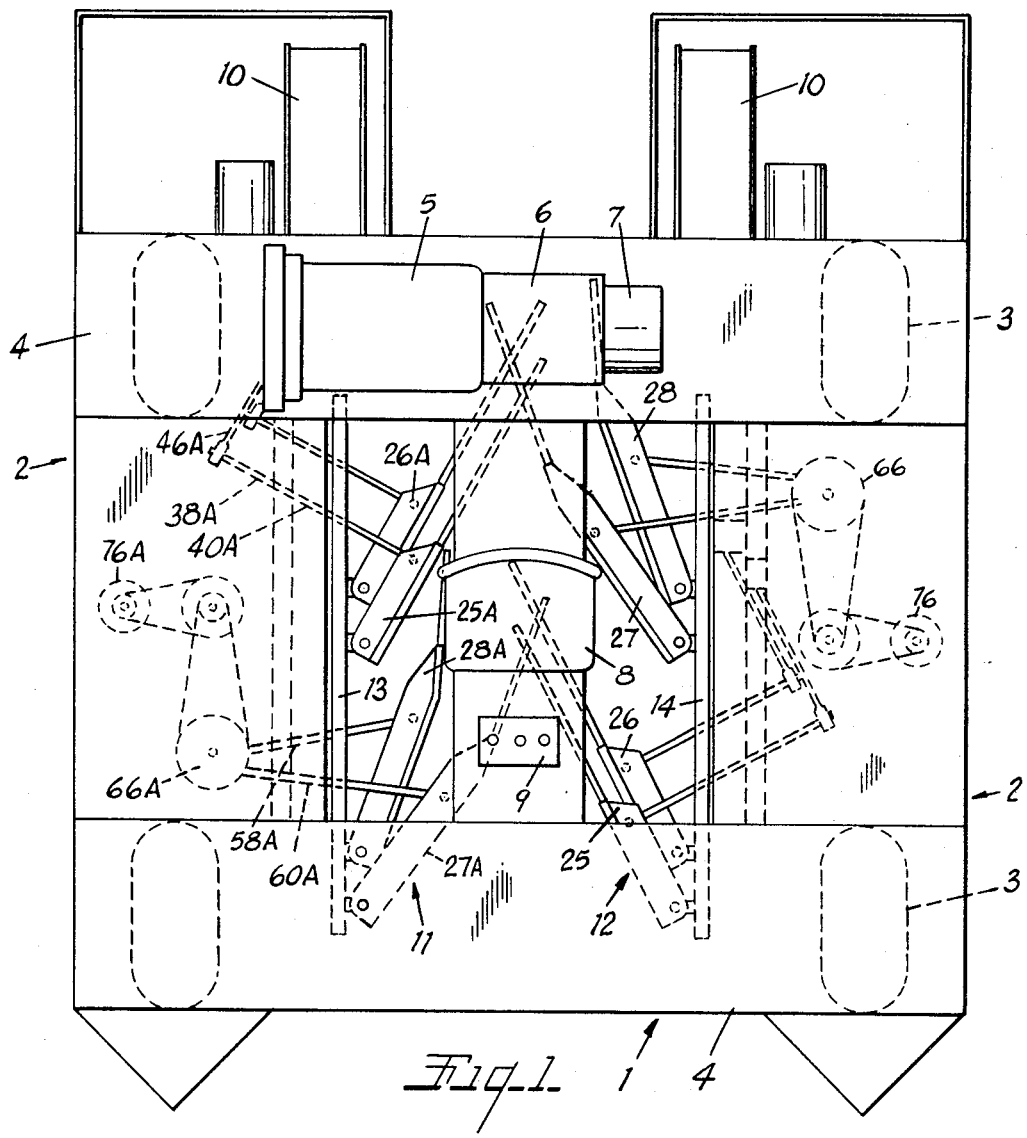
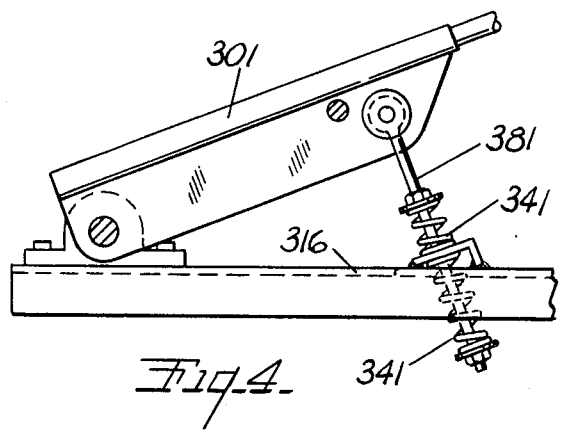

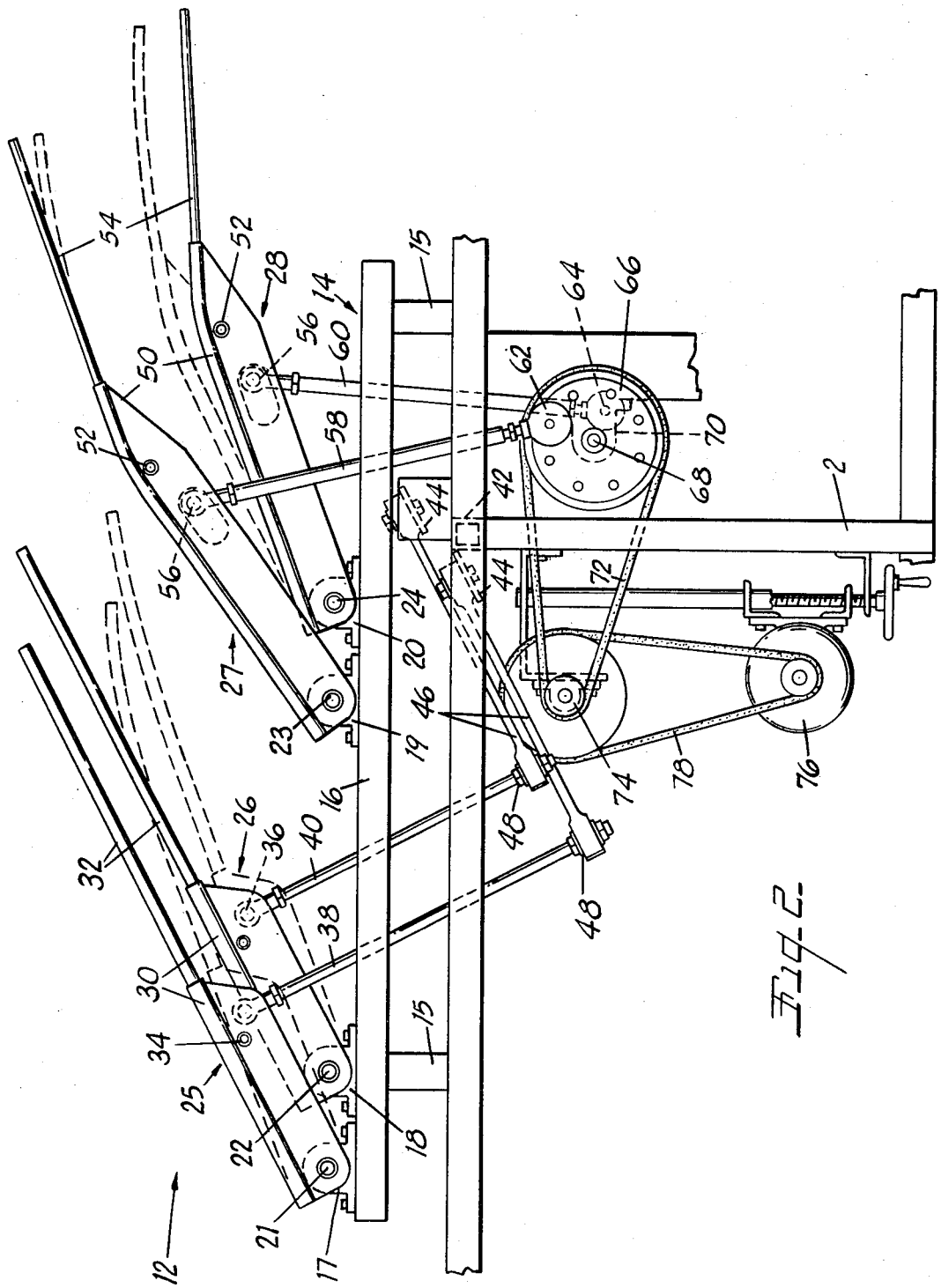

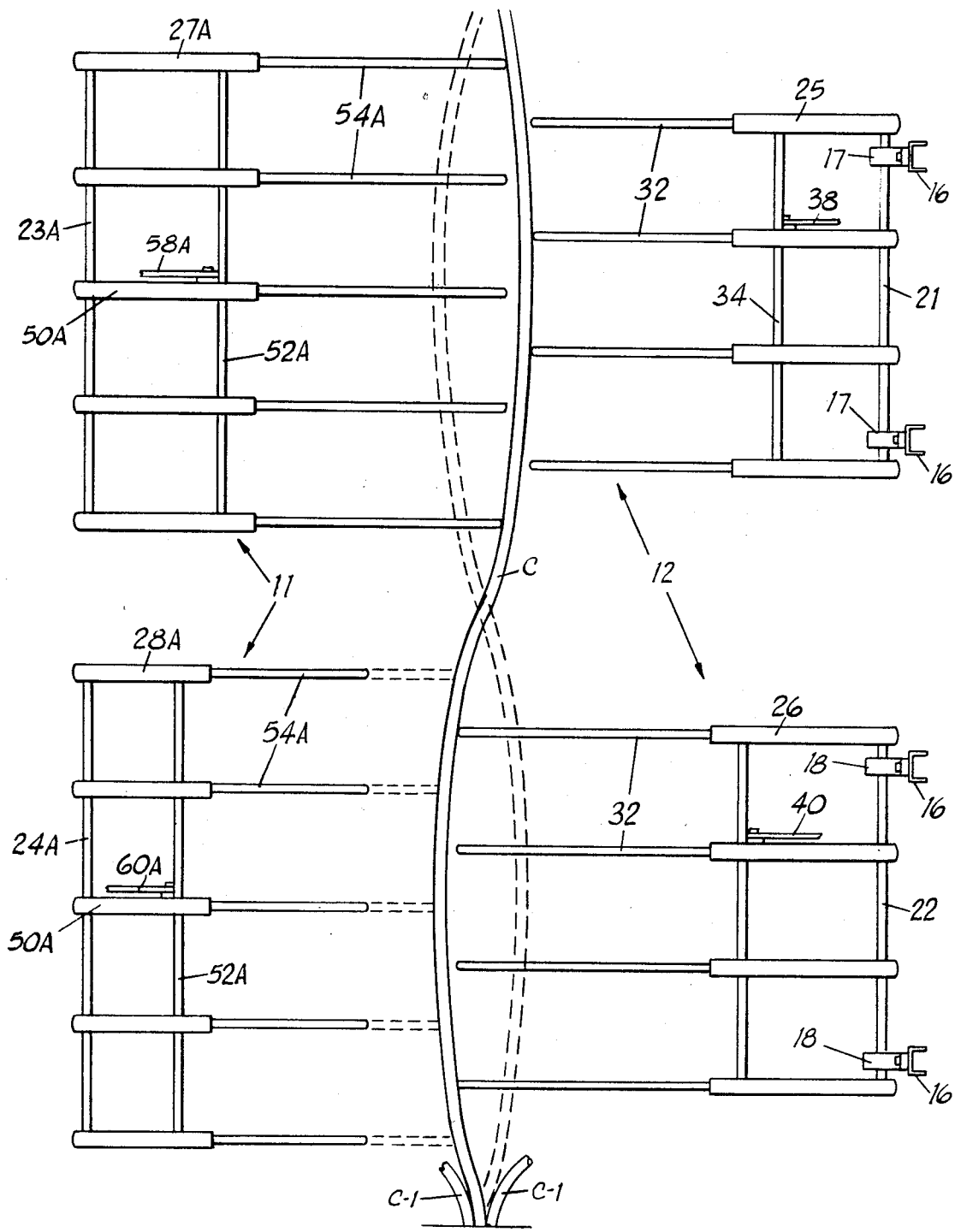

RASPBERRY HARVESTER

RELATED APPLICATION

This application is a variation of and an improvement on the harvester disclosed in the copending application by Albert Patzlaff, Ser. No. 41,124, filed May 25, 1970, now U.S. Pat. No. 3,611,689, dated Oct. 12, 1971.

DESCRIPTION

The drawings of which there are three sheets, illustrate a preferred form of the harvester, and one alternate or modified form of means for spring biasing the yieldable frame sections which oppose the driven oscillating sections.

FIG. 1 is a top plan view of the harvester.

FIG. 2 is an enlarged fragmentary top plan view of the crop presser and crop shaker frames on one side of the machine.

FIG. 3 is a front elevational view schematically illustrating the action of the frame sections.

FIG. 4 is a fragmentary plan view of a modified form of mounting for the crop presser frames.

The harvester consists generally of a mobile carriage 1 having raised side frames 2 mounted on wheels 3 and connected at the top by rigid cross members 4 to form a self propelled machine to straddle a crop row. An internal combustion engine 5 drives an hydraulic pump 6 and an electric generator 7 as sources of power for the parts of the machine, and an operators seat 8 and control panel 9 are supported centrally over the crop straddling portion of the machine. Berries shaken from the bushes between the side frames are collected on deflector plates, not illustrated, and delivered to collector conveyors 10 for delivery to the rear of the machine in a known manner. The present invention lies in a new and improved arrangement of crop engaging parts which cause the berries to be separated from the bushes as the machine advances along the crop row.

The side frames of the machine which structurally support and connect its several parts are collectively or generally indicated by the numeral 2 and serve as supports for crop engaging assemblies indicated at 11 and 12 on the right and left sides of the machine respectively. Each assembly includes a support frame 13 and 14 which is connected in an upright longitudinally extending plane to the side frames 2 by suitable connecting bars or brackets 15. The support frames and crop engaging assemblies are similar, but with certain parts reversed. The details of the left assembly are illustrated in FIG. 2. The machine advances towards the bottom in FIG. 1, and towards the left in FIG. 2.

As appears more clearly in FIGS. 2 and 3, the support frame 14 includes vertically spaced and longitudinally extending bars 16. These bars carry upper front bearings 17, lower front bearings 18, upper rear bearings 19 and lower rear bearings 20. The bearings rockably support pivot bars 21, 22, 23 and 24 respectively. The pivots 21 and 22 oscillatably support an upper crop presser frame 25 and a lower crop presser frame 26 in generally vertically aligned position; while pivots 23 and 24 oscillatably support an upper crop shaker frame section 27 and a lower crop shaker frame section 28, also in generally vertically aligned position.

The presser frames consist of folded sheet metal arms 30 with rearwardly and inwardly inclined crop engaging presser rods 32 of flexible or springable material secured in tubular folds in the arms. The arms are connected in spaced relation by connector rods 34, and the middle arms of each frame have pivot connections 36 to push rods 38 and 40. The presser rods 32 are spaced by a distance of the order of 4 inches, but this spacing can be varied. The push rods 38 and 40 normally urge the flexible crop engaging presser rods 32 to the inclined positions shown where they project somewhat beyond the longitudinal center plane of the machine.

Secured to uprights 42, or other suitable parts of the side frame 2 of the machine, are oblique anchor plates 44 for the rear ends yieldable spring rods 46. The spring rods are desirably of strong flexible wood such as hickory, to withstand fatigue of repeated flexing, but may be made of metal or other similarly flexible material. The forward free ends of the spring rods are connected to the push rods 38 and 40 to 48.

The crop engaging shaker frames 27 and 28 consist of folded sheet metal arms 50, connected in vertically spaced relation by spacer bars 52. Flexible crop engaging shaker rods 54 are secured in tubular folds in the arms and incline rearwardly and inwardly of the machine from the pivots 23 and 24. The middle arms 50 of each shaker frame section 27 and 28 have pivot connections 56, which may be adjustable to vary the throw of the frames, to push rods 58 and 60. The laterally outer ends of the push rods 58 and 60 are pivotally connected at 62 and 64 to rotating crank disks 66. As is shown more clearly in the previously identified application, Ser. No. 41,124, the crank disks are mounted on the upper and lower ends of a shaft 68 carried by a suitable bearing 70 on a sub-element of the machine side frame 2. A pulley on the shaft is driven by a belt 72 from an idler pulley 74, and the idler is in turn driven by an electric motor 76 through the belt 78. The motor speed and drive train are designed to drive the crank disks and the crop engaging shaker frames at between 100 and 400 cycles per minute, with about 150 cycles per minute being optimum for raspberry crops.

As is also disclosed in the prior application, the crank pin connections 62 and 64 are angularly adjustable about the crank disks so that the upper shaker frame may be operated in out of phase relation to the lower shaker frame.

With particular reference to FIG. 1, it will be noted that the positioning of the crop engaging presser frames and shaker frames on the right crop engaging assembly 11 and support frame 13 are arranged oppositely to the positions of the corresponding parts on the left side of the machine. Upper and lower crop engaging shaker frames 27A and 28A are mounted at the front of side support frame 13, where they will be opposed to crop presser frames 25 and 26. Similarly, crop presser frames 25A and 26A on the right side of the machine are mounted towards the rear where they will be opposed to the left shaker frames 27 and 28. In other respects the structures on the two sides of the machine are similar; with the push rods 58A and 60A connected to crank disks 66A and a motor 76A which are suitably mounted towards the front of the machine. The push rods 38A and 40A extend to spring rods 46A which are mounted toward the rear of the machine.

OPERATION

FIG. 3 conventionally illustrates the action of the harvester in passing across a normally upright central stalk or cane C of a raspberry bush. The leading upper shaker frame 27A is advanced inwardly so that its flexible shaker bars 54A press the upper end of the cane to the right of the center. Movement of the cane is opposed and it is held against the bars 54A by the presser bars or rods 32 of yieldably retracted presser frame 25. Below the upper crop engaging frame sections, the lower front shaker frame 28A is retracted so that its bars 54A clear the cane. But the lower part of the cane is deflected oppositely by the pressure of presser rods 32 on yieldably extended presser frame section 26. Note that the individually yieldable deflection of rods 32 produces a slight bow in the lower portion of the cane that is convex to the left as shown in full lines.

When the positions of the shaker frames are reversed by the push rods 58A and 60A the bows in the upper and lower parts of the cane are reversed as shown by the dotted lines. The yieldable presser bars 32 function to dampen the movement of the cane and cause it to follow the shaker bars in an undulating whipping motion. It should be especially noted that a similar but more exaggerated motion will be imparted to divergent side canes C-1 of the bush; and further that the side canes will be moved transversely of their lengths in a wiping or rubbing action, relative to the central cane. It has been found that this rubbing action is especially effective in separating or pulling ripe berries from the canes. This results in a gentle but efficient picking action without resorting to more violent bumping and shaking action of driven shaker frames alone, which may result in damage to the canes and the breaking or shaking off of berries that are not yet ripe and ready for harvest.

The example of the harvester illustrated divides the crop engaging frames vertically into two tandem sections in which the bush is subjected to driven shaking action on first one side and then the other side, while being yieldably held against the shaker frames in each position. Note that the use of vertically spaced bush engaging bars or rods 32 and 54 in the crop engaging frames, and the individually flexible nature of these rods permits the shaker and presser elements to slip through and between the smaller branch stems and shoots of the bush without damage to the berry clusters. The driven shaking action of the frames is therefore applied to the principle and heavier canes of the bush where it is most effective in the action just described.

The yieldable pressing action of the presser frames can be achieved by various mechanisms, as can the shaking action of the shaker frames. FIG. 4 shows briefly how the push rod 381 of an arm 301 of a presser frame may be passed through a guide hole in the longitudinal member 316 of bush engaging assembly. Springs 341 are retained around the rod on both sides of the frame member to produce the yieldable supporting action of springable rods 40.

What is claimed as new is:

1. In a mobile harvesting machine adapted to be advanced along a crop row in straddling relation with crop engaging assemblies arranged to simultaneously engage opposite sides of the crop and extending vertically to act on the major portion of the crop, a driven crop engaging frame having its leading edge pivotably mounted on one side of said machine with its trailing edge swingable laterally away from said one side, drive means connected to said driven frame for oscillating said driven frame about its pivot towards and away from said one side, a second crop engaging frame opposed to said driven frame and having its leading edge pivotably mounted on the opposite side of the machine, and yieldable means connected between said second frame and said machine and biasing the trailing edge of said second frame inwardly of said machine and away from said opposite side.

2. A harvesting machine as defined in claim 1 in which each of said frames comprises a plurality of vertically spaced crop engaging rods that are freely self supporting at their rear ends.

3. A harvesting machine as defined in claim 2 in which said crop engaging rods are individually flexible and yieldable to pressure against the crop created by the combined actions of said drive means and said yieldable means.

4. A harvesting machine as defined in claim 1 in which said crop engaging frames on both sides of the machine are divided horizontally into upper and lower crop engaging sections, there being two drive means connected to separately oscillate the upper and lower drive frame sections, and two yieldable means connected to yieldably bias the two opposed frame sections.

5. A harvesting machine as defined in claim 1 in which said crop engaging assemblies on both sides of the machine are divided vertically into leading and trailing tandem sections, there being a driven crop engaging frame at the leading end of one assembly and another driven crop engaging frame at the trailing end of the opposite assembly, there being two crop engaging frames each opposed to a different one of said driven frames, two drive means connected to separately oscillate said driven crop engaging frames on opposite sides of the machine, and two yieldable means connected to separately bias the opposite crop engaging frames opposed to said driven frames.

6. A harvesting machine as defined in claim 5 in which said crop engaging frames on both sides of the machine are divided horizontally into upper and lower crop engaging sections, there being two drive means connected to separately oscillate the upper and lower drive frame sections, and two yieldable means connected to yieldably bias the two opposed frame sections.

7. A harvesting machine as defined in claim 6 in which each of said frames comprises a plurality of vertically spaced crop engaging rods that are freely self supporting at their rear ends.

8. A harvesting machine as defined in claim 7 in which said crop engaging rods are individually flexible and yieldable to pressure against the crop created by the combined actions of said drive means and said yieldable means.

9. A harvesting machine as defined in claim 4 in which said two drive means are connectable to oscillate said upper and lower driven frame sections in different phase relation.

10. A harvesting machine as defined in claim 5 in which said crop engaging frames comprise vertically spaced and longitudinally extending rods that are freely self supporting at their trailing ends, the trailing ends of the rods in the leading frame sections extending rearwardly into lateral overlapping relation to the leading edges of the trailing frame sections.

11. A harvesting machine as defined in claim 1 in which said drive means is arranged to oscillate said driven crop engaging frame at an amplitude which will swing its trailing edge of the frame across the center longitudinal plane of the machine, said yieldable means being arranged to yieldably bias the trailing edge of said second crop engaging frame across the center longitudinal plane of the machine.

12. A harvesting machine as defined in claim 11 in which each of said crop engaging frames comprises a plurality of vertically spaced and longitudinally extending crop engaging rods that are self supporting and unconnected at their trailing ends, said crop engaging rods being individually flexible and yieldable to pressure against the crop created by said drive means and said yieldable means, said drive means being arranged to oscillate said driven crop engaging frame at between 100 and 400 cycles per minute.

13. A harvesting machine as defined in claim 12 in which said drive means oscillates said driven crop engaging frame at a speed of the order of 150 cycles per minute.

* * * * *